June 27, 1961 F. G. CANNINGS 2,990,127

TAPE-FEEDING APPARATUS

Filed May 8, 1959

Inventor

FREDERICK G. CANNINGS

By [signature]

Attorneys

United States Patent Office 2,990,127

Patented June 27, 1961

2,990,127

TAPE-FEEDING APPARATUS

Frederick George Cannings, Morden, England, assignor to International Computers and Tabulators Limited, London, England, a British company Filed May 8, 1959, Ser. No. 812,047
Claims priority, application Great Britain May 30, 1958
5 Claims. (Cl. 242—55.12)

This invention relates to tape-feeding apparatus and in particular to apparatus of the kind in which a tape, for example a magnetic tape for use in electronic computing machines, can be fed on to or off of a spool, and in which rotation of the spool and the direction of rotation of the spool can be controlled by the length of a tape loop depending from the spool and drawn into a reservoir by negative air pressure.

Apparatus of the kind above referred to is well known in the art and it has been proposed to initiate rotation of the spool by the use of photo-electric devices or by pressure-operated switches operable by the position of the tape loop in the reservoir.

While the above mentioned photo-electric devices and pressure-operated switches operate adequately to perform the functions required thereof, they have been expensive to produce and maintain and it is a main object of the present invention to provide tape-feeding mechanism with tape loop-controlled pressure-operated switches which are of simple construction and which are relatively cheap to produce and maintain.

According to the present invention there is provided tape-feeding apparatus in which negative air pressure is arranged to draw into a reservoir a tape loop adapted to depend from a spool rotation of which is effected by electrically operable driving means controllable by a first and a second pressure-operated switch spaced apart lengthwise of the reservoir, and in which each switch comprises a fixed and a movable contact connected in the circuit for the driving means and a flexible loop connected with the movable contact and located in a chamber which communicates with the interior of the reservoir so that according to the position of the tape loop the flexible loop has atmospheric or negative air pressure applied thereto thereby to cause movement of the flexible loop to effect engagement or disengagement, as appropriate, of the movable contact relative to the fixed contact.

Figure 1:
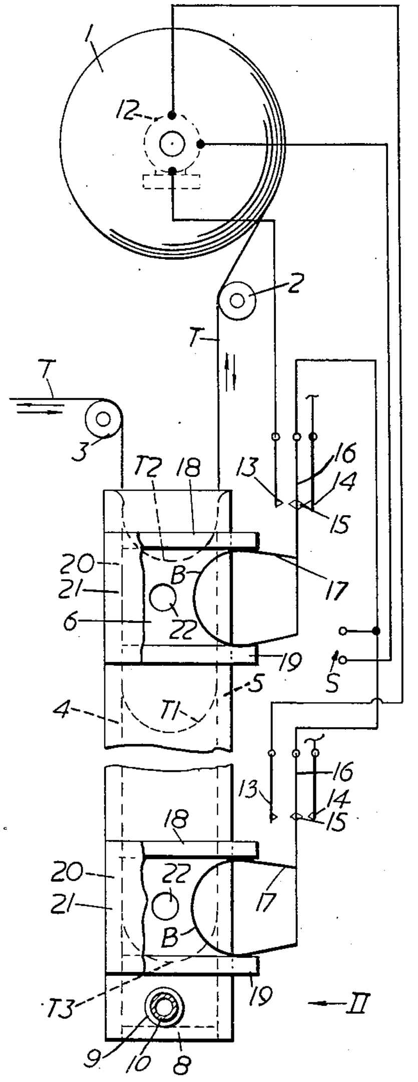
Figure 2:
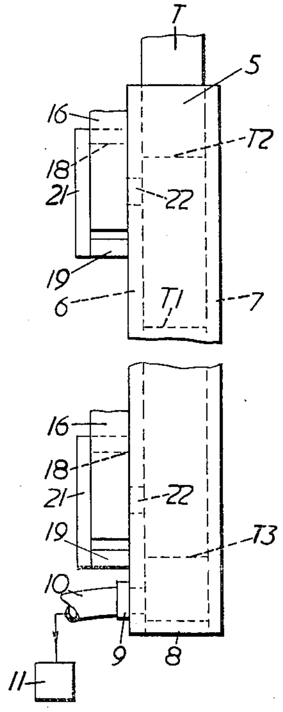

In order that the invention may be clearly understood, one embodiment thereof will now be described, by way of example, with reference to the accompanying diagrammatic drawings in which:

FIG. 1 is a diagrammatic view, partly in section, showing the apparatus according to the invention, and FIG. 2 is a view, looking in the direction of arrow II, FIG. 1.

Referring to the drawings a tape T, for example a magnetic tape, is in part contained on a spool 1 from which it passes over guide rollers 2, 3 to a further spool, not shown. When the tape is a magnetic tape, for example as used with electronic computing machines, the tape, after passing guide roller 3, is moved beneath a read and/or write-head, not shown, and as is customary there is provision for the tape to be moved in either of two directions, as illustrated by the arrows in FIG. 1.

Between the tape spool 1 and the guide roller 3 there is located a reservoir in which the tape is looped. The reservoir comprises a channel formed by opposed end walls 4, 5, side walls 6, 7 and a bottom 8. The side wall 6 is provided with a conduit connection 9 for connection through a conduit 10 with a source 11 of negative air pressure of any suitable form. The negative air pressure applied to the reservoir through conduit 10 draws the tape against the inner surfaces of the end walls 4 and 5 towards the bottom 8 of the reservoir.

The tape spool 1 is rotatable in either of two directions by electrically operable driving means which for the purpose of illustration is considered to be a reversible motor 12 electrically connected with a source S of power.

The apparatus includes two switches spaced apart lengthwise of the reservoir and each adapted for connection in the circuit for the motor 12. The switches are disposed, see FIG. 1, one near the open end of the reservoir and one near the bottom thereof and are of like construction and are arranged to hold the motor circuit normally open. Each switch comprises a pair of fixed contacts 13, 14 and a movable contact 15 located therebetween and biassed, as by a spring mounting 16, to engage the fixed contact 14. The fixed contacts 13 are connected in a circuit, not shown, which controls operation of a brake, not shown, for the spool 1.

Each movable contact 15 is connected to piston-like means 17 which is located in a chamber for movement in either of two directions according as to whether the tape loop in the reservoir is disposed within the reservoir to permit negative or atmospheric air pressure to be admitted to the chamber through an opening connecting the interior of the reservoir with the interior of the chamber. As illustrated in the drawings each chamber comprises a top wall 18, a bottom wall 19, an end wall 20 each of which is secured to the side wall 6 of the reservoir, and a side wall 21. The remaining wall of the chamber is formed by the side wall 6 of the reservoir and the opening 22 which connects the reservoir with the chamber is formed in the side 6 of the reservoir. As can be seen from the drawings, the piston-like means 17 are constituted by flexible strips formed into loops with their ends connected to the movable contacts 15, and these looped strips extend through open sides of the chambers substantially at right-angles to the open top of the reservoir through which the tape loop depends into the reservoir.

When the apparatus is in operation, while the base of the tape loop is below the opening 22 appertaining to the first switch, that is the switch nearest the open end of the reservoir, as indicated at T1, the chamber associated with this opening is at atmospheric pressure and the movable contact 15 is in the biassed position thereof, as shown in FIG. 1, in which it is engaged with the fixed contact 14 and the motor circuit is open. If, however, the length of the tape loop shortens so that the base thereof rises above the opening 22, as indicated at T2, FIG. 1, then the pressure in the chamber is reduced to that of the negative air pressure acting on the base portion of the tape loop and the reduced pressure in the chamber acts on the base portion B of the flexible loop 17 to cause the flexible loop to be drawn to the left, as viewed in FIG. 1, so that the movable contact 15 is disengaged from the fixed contact 14 and is moved into engagement with the fixed contact 13, thus causing the tape spool brake to be released and the motor 12 to be started to effect feeding of more tape into the reservoir.

Should the length of the tape loop be such that the base thereof is located below the opening 22 appertaining to the second switch, as indicated at T3, then the pressure in the chamber associated with this opening, and which is normally that of the negative air pressure applied to the base of the tape loop, is restored to that of the atmosphere so that the flexible loop in the chamber is caused to move to the right as viewed in FIG. 1. The movable contact 15 is thus caused to engage fixed contact 13 thus causing the motor 12 to be started and rotated in a direction such as to re-wind the tape on to the spool 1. Rotation of the motor will continue until the base of the tape loop is again disposed above the opening 22 when the pressure in the second chamber will be restored to that of the negative air pressure applied to the base of the tape loop and the switch will return to the normal position thereof thus opening the circuit to the motor and causing the brake to be applied to the spool.

It will be understood that although in the foregoing description the flexible loop 17 has been described as connected directly to contact 15, if desired connection between the loop 17 and contact 15 may be effected through a simple linkage, for example through a pivoted bell-crank lever.

I claim:

1. Tape-feeding apparatus comprising an open-topped reservoir having first and second openings spaced apart lengthwise thereof to permit the access of atmospheric pressure to the reservoir, a spool from which a tape loop may depend into the reservoir through the open top thereof, tape feeding means including a reversible electric motor operatively connected with the spool to effect rotation thereof, a control circuit connected with said motor, a conduit connected with the interior of the reservoir adjacent the bottom thereof and with a source of negative pressure to draw the tape loop into the reservoir, and first and second pressure-operated switches in said motor control circuit and controllable respectively by atmospheric pressure entering the reservoir through said first and second openings and by the position of the bottom of the tape loop as determined by negative pressure controlled by said source; each of said switches including a chamber in communication through the respective one of said openings with the interior of the reservoir, a fixed contact and a movable contact biased to engage the fixed contact, each of said contacts being connected in said control circuit and being engaged when said circuit is open, and a piston-like means connected to the movable contact and operable in said chamber to be subjected to the pressure therein according to the position of the tape loop in the reservoir relative to said openings and thereby to control movement of the movable contact into and out of engagement with the fixed contact.

2. Tape-feeding apparatus according to claim 1, wherein the reservoir and said chambers have one wall in common and said openings are in the said common wall to provide the communication between the reservoir and chambers.

3. Tape-feeding apparatus according to claim 1, wherein each switch includes a motor brake-controlling contact connected in said motor control circuit to be engaged by said movable contact on disengagement of the movable contact from said fixed contact.

4. Tape-feeding apparatus according to claim 1, wherein the reservoir includes opposed end and side walls one of which is provided with both of said openings, a bottom, and an open top and wherein each of said chambers includes a top wall, a bottom wall and an end wall all secured to said one side wall of the reservoir, a chamber side wall secured to said top, bottom, and end walls, and an open side substantially at right angles to the open top of the reservoir and through which the respective piston-like means extends into the chamber.

5. Tape-feeding apparatus according to claim 1, wherein said piston-like means comprises a flexible strip formed into a loop with its ends connected to said movable contact.

References Cited in the file of this patent

UNITED STATES PATENTS

| | | |
|---|---|---|
| 2,792,217 | Weidenhammer et al. | May 14, 1957 |